United States Patent [19]

Römpp

[11] Patent Number: 4,980,216

[45] Date of Patent: Dec. 25, 1990

[54] TRANSFER FOR TEXTILES

[76] Inventor: Walter Römpp, Rosenstrasse 46, D-7406 Mossingen, Fed. Rep. of Germany

[21] Appl. No.: 109,708

[22] Filed: Oct. 16, 1987

[51] Int. Cl.⁵ .............................................. B32B 5/08
[52] U.S. Cl. ..................................... 428/90; 428/200; 428/201; 428/349; 428/914
[58] Field of Search .................. 428/914, 90; 156/230, 156/234, 235, 239, 240, 233

[56] References Cited

U.S. PATENT DOCUMENTS

| | | | |
|---|---|---|---|
| 3,956,552 | 5/1976 | Geary | 428/914 |
| 4,012,552 | 3/1977 | Watts | 156/233 |
| 4,049,374 | 9/1977 | Rejto | 428/914 |
| 4,064,297 | 12/1977 | Power et al. | 428/90 |
| 4,142,929 | 3/1979 | Otomine et al. | 428/914 |
| 4,201,810 | 5/1980 | Higashiguchi | 428/914 |
| 4,267,219 | 5/1981 | Ueno et al. | 428/90 |
| 4,273,817 | 6/1981 | Matsuo et al. | 428/90 |
| 4,282,278 | 8/1981 | Higashiguchi | 428/90 |
| 4,292,100 | 9/1981 | Higashiguchi | 428/914 |
| 4,314,813 | 2/1982 | Masaki | 156/234 |
| 4,340,632 | 7/1982 | Wells et al. | 428/914 |
| 4,346,662 | 8/1983 | Higashiguchi | 428/914 |
| 4,687,527 | 8/1987 | Higashiguchi | 428/914 |
| 4,741,791 | 5/1988 | Howard et al. | 156/239 |

FOREIGN PATENT DOCUMENTS 1598161 9/1981 United Kingdom .

Primary Examiner—George F. Lesmes
Assistant Examiner—J. Davis

[57] ABSTRACT

A transfer for the application of a design on textiles, comprising a carrier paper, with a layer of adhesive on the carrier paper, with a design layer, and with, disposed on top of the design layer, a hot glue layer. The carrier paper is rigid in respect of temperature and/or moisture. An interface of separating layer is applied on the design layer in areas which are intended to have an effect other than that of the design layer. Imprinted on the separating layer is an effect layer which acts in a different manner. The separating layer has separating properties with regard to the effect layer. On the effect layer there is a hot glue layer.

27 Claims, 2 Drawing Sheets

TRANSFER FOR TEXTILES

The invention relates to a transfer for the application of a design on textiles and a method for producing such a transfer.

BACKGROUND OF THE INVENTION

Such transfers have a carrier paper, a layer of adhesive on the carrier paper, a design layer for producing an effect on the textile, and a hot glue layer disposed on top of the design layer. Such transfers are disclosed, for instance, in German Offenlegungsschriften Nos. 28 55 711, 28 35 834, 30 15 510 and U.S. Pat. No. 4,142,929.

The disadvantage with the prior art constructions is that only one effect can be transferred by the transfers. For example, flock can be transferred or a metal coating can be transferred. Therefore, of the originally produced carrier systems, it is possible just to transfer one effect, namely, the effect applied to the carrier system, with any fidelity to the pattern.

OBJECT AND STATEMENT OF THE INVENTION

The object of the invention is to provide a transfer in which it is possible to transfer at least two, and up to any desired number of effects.

According to the invention, this object is achieved as follows: The carrier paper is rigid in respect of at least temperature or moisture. A separating layer is situated as an interface on the design layer in areas that are intended to have an effect other than that of the design layer. An effect layer is imprinted on the separating layer that provides an effect different from the design layer. The separating layer has separating properties with respect to the effect layer. And a hot glue layer is situated on the effect layer.

With regard to the method for producing the transfer, the object is achieved by:
(a) placing a layer of adhesive on a carrier paper that is rigid in respect of at least temperature or moisture
(b) placing a design layer on the adhesive
(c) placing a separating layer on the design layer in areas intended to have an effect other than the design layer, which has separating properties with respect to an effect layer
(d) imprinting on the separating layer an effect layer that is different from the design layer, and
(e) disposing a hot glue layer on the design layer and the effect layer.

Additionally, they invention may include the following advantageous features:

The carrier paper may be glass fiber-reinforced paper, a synthetic plastic film, a polyester film, or synthetic fiber-reinforced wet-strength resin glued paper. These carrier papers exhibit particularly little shrinkage under heat and/or moisture.

The design layer may be a flock layer. The flock technique can be combined with the effect brought about by the effect layer. The same applies logically to metal coatings, including a design layer that is a metal layer deposited by vaporization in a high vacuum, preferably an enamel layer covered by an aluminum layer. The effect achieved by the metal coating can be attuned to the effect resulting from the effect layer.

The separating layer may be a freely cross-linkable silicon emulsion, particularly a polysiloxane compound. This has been found to be particularly suitable regardless of which design layer is combined with the effect layer. It is equally suitable for the flock transfer technique as it is for the metal coating transfer technique. Also, the material of a separating layer that provides good properties may be type C1G 2 pure. This is a non-ionic mixture of silicones, gliding agents, and antistatics. It is obtainable from Chemische Fabrik Tubingen, of D-7400 Tubingen, Bismarckstrasse 102, West Germany. Other manufacturers can offer materials of a similar type.

The separating layer may be screen-printable. It is possible to work particularly well with this material and the contours are well defined.

The separating layer may be manufactured on a paraffin base and/or a fluorocarbon resin base. These separating layers have also proved very satisfactory.

The separating layer may be ink-printable. The separating layer can be applied under control by means of data processing equipment.

The separating layer may be intaglia-printable. This is a readily usable printing technique. The same applies logically to a separating layer that is flexo-printable.

The separating layer may be a cold-fixing paste. No heat-occasioned distortion occurs in the carrier paper nor in the other layers so that a very register-accurate printing result is possible. (Register can be equated with accurate matching of original copy, for example in the case of multi-color prints).

The separating layer may be printed through a middle-free screen printing template in the range from 29 to 90 threads per sq. cm. preferably from 40 to 50 threads per sq. cm. This leads to sharp definition and easy detachment.

The effect layer may be a printing paste. This makes it possible to resort to prior art compositions.

The printing paste may be of the type TUBIPLAST HO. This is a high covering, pigmented plastison ink for textile printing. This results in particularly good layer structures, processing possibilities and properties on the textiles. Printing paste under the designation TUBIPLAST HO is freely available from Chemische Fabrik Tubingen. Other suppliers have printing pastes of similar and likewise usable types.

The printing paste may be of the type ELASTOBOND, or type TUBIVINYL 235 S or type LAC FLEX. As appropriate, the same is also true of these materials. Turbitrans Elastobond is a high viscosity, synthetic resin emulsion, cross-linkable at high temperatures. Turbivinyl 2355 is a hot fixing adhesive system based on an acrylic resin dispersion. LAC FLEX is a ready-made paste with flexible properties for printing dark ground textiles.

Insofar as it is homogeneous, the printing paste may be printed through a middle-free screen printing template in the range from 29 to 90 threads per sq. cm., preferably in the 40 to 50 range. This likewise results in sharp definition, simple construction and satisfactory behaviour on the textiles.

Admixed with the effect layer may be a material selected from one or more of the following materials: flock, synthetic plastic spangle, metal spangle, mica pigments, reflective glass beads, metal bronzes and metallized lacquer. As a result, particularly interesting effects are available exhibiting particularly good properties both during manufacture of the transfer in the transfer itself and also on the textiles.

However, it is then recommended that the effect layer be formed as follows: The printing paste may be printed through a coarse screen printing template in the range from 10 to 29 threads per sq. cm., preferably in the range of about 20 threads per sq. cm.

DESCRIPTION OF THE DRAWINGS

The invention will now be described with reference to preferred embodiments shown in the accompanying drawings, in which:

FIGS. 1 and 2 are for the flock technique;

DETAILS OF PREFERRED EMBODIMENTS

Figure 2:
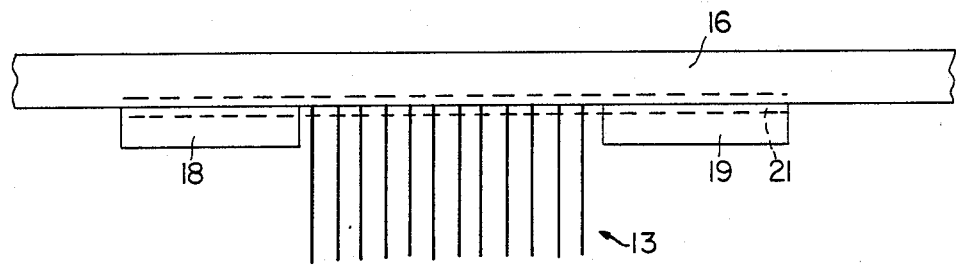
FIG. 2 shows a diagramatic cross-section through a textile with an applied design.

A paper 11 is a glassfiber reinforced paper. On it there is a continuous layer of adhesive 12. Viscose flock 13 is shot into it electrostatically. The viscose flock is held only at the tips of the fibers. The flock fiber particles are not laterally bonded to one another. The adhesion of the fiber tips in the adhesive 12 is so great that rolling-up or unrolling of the paper and further processing by the screen printing process are possible, while on the other hand it is guaranteed that the flock fiber particles can be withdrawn again from the adhesive.

On the opposite side of the viscose flock 13, a filling paste 14 is applied using the screen printing process (or some other process). It will be applied according to the design required. The function of the filling paste 14 is to penetrate completely the voluminous viscose flock 13 underneath at those places where it is intended there shall subsequently be no viscous flock 13 on a textile 16. In the region of the filling paste 14, a separating layer 17 is applied by screen printing onto the viscous flock 13. It consists of silicon finish 19E containing 20% of a cross-linking agent. Silicon-finish 19E is a non-ionic polysiloxane and hydrogen siloxane emulsion. During production, it will have first been dried and then fixed at 150 degrees Celsius.

Effect layers 18, 19 are applied with register precision to the separating layers 17. Printing pastes are used. The effect layer 18—a glitter paste—consists of 100 parts TUBIVINYL 235S plus 30 parts glitter polyester 25/20 Dragon plus 3% FC 430 (50% in soft water).

In the effect layer 19, instead of the glitter, there are microscopically small glass beads. The gauze fineness of the paste for the separating layer 17 and the effect layers 18, 19 have a positive influence on the surface of the effect layers 18, 19. If glitter has been incorporated into the effect layers 18, 19, for example, then the separating layer 17 will be even more satisfactorily cross-linked.

On the effect layers 18, 19 and the surface of the viscose flock 13 which is not impregnated with a filling 14, there is a hot glue layer 21.

The filling pasted 14 is not absolutely necessary. Certainly, the action of the effect layers 18, 19 abates somewhat if they are filled with bright materials. With effect from a flock length of, for example, 0.75 mm, therefore, one ought to use the filling paste 14. If the flock is of type B 3 and B 5, then one can economize on the filling paste 14. A suitable paper 11 is Petrex B 40. B3 is a flock transfer paper having a flock length of 0.3 mm. B5 is the same as B3 except that the flock length is 0.5 mm. Pretex is a paper having a mass per unit area of 133 g/m².

After application of the separating layer 17, particularly after the fixing stage, the separating layer 17 can be pressed smooth under high pressure, silicon paper, for instance, being used at the intermediate layer. Then, with ELASTOBOND or TUBIPLAST 40 as the effect paste, highly brilliant lacquer effects are obtained.

The effect layer need not necessarily be a printing paste. In fact, glitter or grains of granulate can be sprinkled directly into the wet separating layer 17. If transparent glitter is used then a clear layer must be used as a backing because otherwise the hot glue layer 21 will penetrate right through to the separating layer 17.

Figure 1:
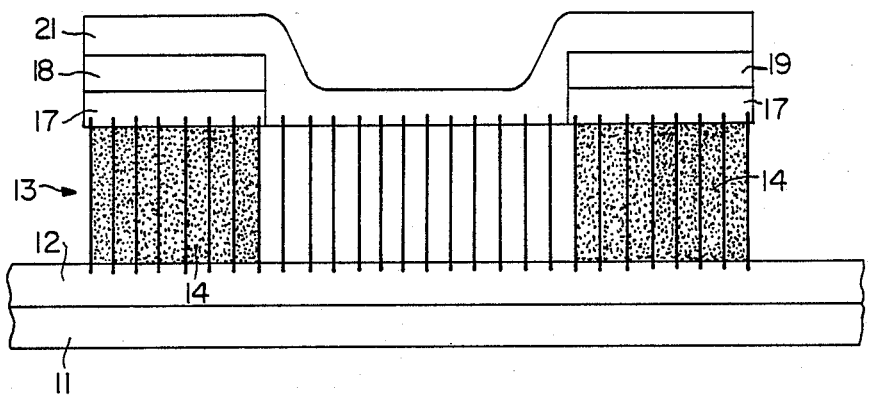
FIG. 1 shows a diagramatic cross-section through a transfer.

If a layer according to FIG. 1 is ironed onto a textile 16 according to FIG. 2, then the situation shown in that illustration will be created. The hot glue layer 21 passes somewhat into the textile 16, holds the middle zone of the viscous flock 13 securely if no filling past 14 has been impressed on it. The effect layers 18, 19 remain glued fast likewise on the textile 16. The separating layer 17 is in a position more easily to detach the effect layers 18, 19 from the viscous flock 13 in the region of the filling past 14 when the transfer is pulled off then there would be a separation between the glue 12 and the viscose flock 13 in the region of the filling paste 14. Therefore, in the region of the filling paste 14, the fibers of the viscose flock 13 cannot be torn out of the glue 12. Instead they remain on the paper 11.

Figure 3:
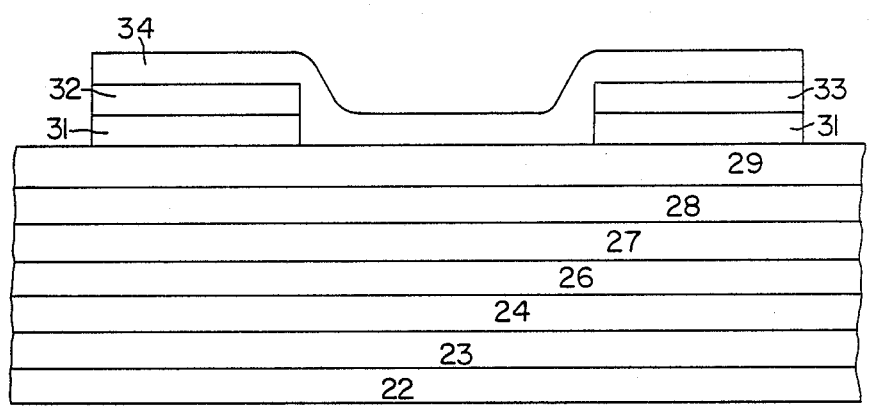

According to FIG. 3, the construction consists of a carrier paper 22, namely of the CHROMOLUX 150 g/sq. m type. Chromolux is a white, high gloss cast coated woodfree paper. On it there is a lining glue 23. Then there is a polyester film 24 which is 12 to 36 μm thick. This is followed by a release layer 26 and then a lacquer layer 27, followed by an aluminum layer 28 which is the thickness of a few atoms and which has been created by evaporation of metal in a high vacuum. On this there is a protective lacquer layer 29. Visually the aluminum layer is disposed behind the protective lacquer layer 29, and if the protective lacquer layer 29 is glass clear, then a silver effect is obtained. If the protective lacquer layer 29 comprises gold-colored pigments, then a metallic gold effect is obtained because the aluminum layer 28 shines through in metallic fashion, etc.

Imprinted onto the protective lacquer layer 29 are separating layers 31 which correspond to the motif. Imprinted thereon in turn in accurately registered fashion are effect layers 32, 33 and onto the effect layers 32, 33, as well as onto the intermediate space which is then intended later to exhibit a metal effect, is a hot glue layer 34 which has likewise been applied in a register-precise manner.

The use and the construction of the layers 23 to 29 is known. The use of carrier paper 22 is known in that to date no dimensionally stable paper has been used.

Figure 4:
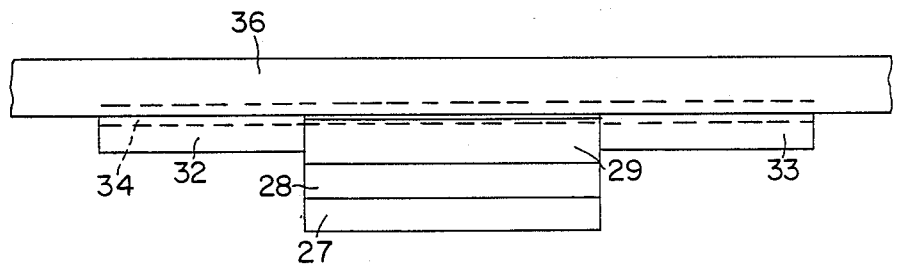
FIGS. 3 and 4 show views as in FIGS. 1 and 2 but for the metal transfer technique.

As can be seen from FIG. 4, after ironing on the hot glue 34, the effect layers 32, 33 remain on the textile 36 and between them and underneath them there is the protective lacquer layer 29, then the aluminum layer 28 and above it the lacquer layer 27.

In terms of thickness, none of the figures is by any means true to scale. Therefore, the lacquer layer 27 does not by any means protrude as shown in FIG. 4. In reality, the effect layers 32, 33 project so that this, too, provides a specific aesthetic effect.

What is claimed is:

1. A transfer for the application of a design on textiles comprising:
   a carrier paper,
   a layer of adhesive on said carrier paper,
   a design layer, a hot glue layer disposed on top of said design layer, and the improvement wherein:
  (a) said carrier paper is rigid in respect of at least temperature or moisture,
  (b) a separating layer is situated as an interface on said design layer in areas that are intended to have an effect other than that of said design layer,
  (c) an effect layer is imprinted on said separating layer that provides said effect different from said design layer,
  (d) said separating layer has separating properties with respect to said effect layer, and
  (e) a hot glue layer is situated on said effect layer.

2. A transfer according to claim 1, wherein said carrier paper is glass fiber-reinforced paper.

3. A transfer according to claim 1, wherein said carrier paper is a synthetic plastic film.

4. A transfer according to claim 3, wherein said carrier paper is a polyester film.

5. A transfer according to claim 1, wherein said carrier paper is synthetic fiber-reinforced wet-strength resin glued paper.

6. A transfer according to claim 1, wherein said design layer is a flock layer.

7. A transfer according to claim 1, wherein said design layer is a metal layer vaporized in a high vacuum.

8. A transfer according to claim 7, wherein said design layer is an enamel layer covered by an aluminum layer.

9. A transfer according to claim 8, wherein said enamel layer is colored.

10. A transfer according to claim 1, wherein said separating layer is a freely cross-linkable silicon emulsion.

11. A transfer according to claim 10, wherein said separating layer is a polysiloxane compound.

12. A transfer according to claim 1, wherein said separating layer is of the type C1G 2 pure.

13. A transfer according to claim 1, wherein said separating layer is screen-printable.

14. A transfer according to claim 1, wherein said separating layer is manufactured on a paraffin base.

15. A transfer according to claim 1, wherein said separating layer is manufactured on a fluorocarbon resin base.

16. A transfer according to claim 1, wherein said separating layer is ink-printable.

17. A transfer according to claim 1, wherein said separating layer is intaglio-printable.

18. A transfer according to claim 1, wherein said separating layer is flexo-printable.

19. A transfer according to claim 1, wherein said separating layer is a cold-fixing paste.

20. A transfer according to claim 1, wherein said separating layer is printed through a middle-free screen printing template in the range from 29 to 90 threads per sq. cm.

21. A transfer according to claim 20, wherein said separating layer is printed through a template in the range from 40 to 50 threads per sq. cm.

22. A transfer according to claim 1, wherein said effect layer is a printing paste.

23. A transfer according to claim 22, wherein insofar as it is homogeneous, said printing paste is printed through a middle-free screen printing template in the range from 29 to 90 threads per sq. cm.

24. A transfer according to claim 23, wherein said template is in the range from 40 to 50 threads per sq. cm.

25. A transfer according to claim 1, wherein admixed with said effect layer is a material selected from one or more of the following materials: flock, synthetic plastic spangle, metal spangle, mica pigments, reflective glass beads, metal bronzes and metallized lacquer.

26. A transfer according to claim 25, wherein said effect layer is a printing paste printed through a coarse screen printing template in the range from 10 to 29 threads per sq. cm.

27. A transfer according to claim 26, wherein said printing paste is printed through a coarse screen in the range of about 20 threads per sq. cm.

* * * * *